United States Patent
Lee et al.

(10) Patent No.: US 12,072,438 B2
(45) Date of Patent: Aug. 27, 2024

(54) DEVICE AND METHOD FOR DETECTING VERTICAL MOUNTING MISALIGNMENT OF RADAR DEVICE, AND RADAR DEVICE WITH THE SAME

(71) Applicant: HL KLEMOVE CORP., Incheon (KR)

(72) Inventors: Han Byul Lee, Seoul (KR); Ho Young Jin, Yongin-si (KR); Jae Hyun Han, Seoul (KR); Jung Hwan Choi, Seongnam-si (KR); Jingu Lee, Ansan-si (KR)

(73) Assignee: HL KLEMOVE CORP., Incheon (KR)

( * ) Notice: Subject to any disclaimer, the term of this patent is extended or adjusted under 35 U.S.C. 154(b) by 645 days.

(21) Appl. No.: 17/313,414

(22) Filed: May 6, 2021

(65) Prior Publication Data

US 2021/0349183 A1    Nov. 11, 2021

(30) Foreign Application Priority Data

May 8, 2020  (KR) .......................... 10-2020-0055152

(51) Int. Cl.
*G01S 7/40*      (2006.01)
*G01S 13/931*   (2020.01)

(52) U.S. Cl.
CPC .............. *G01S 7/4034* (2021.05); *G01S 7/40* (2013.01); *G01S 13/931* (2013.01); *G01S 2013/93271* (2020.01)

(58) Field of Classification Search
CPC ........ G01S 7/40; G01S 7/4026; G01S 7/4034; G01S 13/931; G01S 2013/93271
See application file for complete search history.

(56) References Cited

U.S. PATENT DOCUMENTS 6,026,353 A * 2/2000 Winner .................... G05D 3/12
                                                          702/183
6,896,082 B2 * 5/2005 Asanuma ............... G01S 13/60
                                                          180/169

(Continued)

FOREIGN PATENT DOCUMENTS

CN          102116860 A       7/2011
CN          102680952 A       9/2012

(Continued)

OTHER PUBLICATIONS

Office Action dated Mar. 27, 2024, in connection with Chinese Patent Application No. 202110504238.8, with English machine translation (27 pages).

*Primary Examiner* — Peter M Bythrow
(74) *Attorney, Agent, or Firm* — Hauptman Ham, LLP

(57) ABSTRACT

The present disclosure relates to a device and method for detecting vertical misalignment of a vehicle radar device and vehicle radar device with the same. A radar device according to an embodiment determines a monitoring range including the ground in front by using the radar signal, determines an error of vertical angles for a number of ground distances within the monitoring range, and detects the vertical mounting misalignment of the radar device by using the error. According to embodiments, it is possible to accurately determine the vertical mounting misalignment of the radar device even if there is a road surface non-uniformity, road slope, or radar beam width change.

20 Claims, 12 Drawing Sheets

(56) References Cited

U.S. PATENT DOCUMENTS

| | | | | |
|---|---|---|---|---|
| 8,711,031 | B2* | 4/2014 | Jeong | G01S 7/4026 |
| | | | | 342/75 |
| 9,925,963 | B2* | 3/2018 | Lee | G01S 13/931 |
| 10,180,491 | B2* | 1/2019 | Naruse | G08G 1/166 |
| 10,460,182 | B1 | 10/2019 | Park | |
| 10,996,315 | B2* | 5/2021 | Lim | G01S 13/931 |
| 2004/0080450 | A1* | 4/2004 | Cheong | G01S 13/867 |
| | | | | 342/55 |
| 2004/0117090 | A1* | 6/2004 | Samukawa | G01S 7/4972 |
| | | | | 701/45 |
| 2005/0116854 | A1* | 6/2005 | Beez | H01Q 19/062 |
| | | | | 342/107 |
| 2010/0182199 | A1* | 7/2010 | Jeong | G01S 7/4026 |
| | | | | 342/374 |
| 2011/0156955 | A1* | 6/2011 | Jeong | G01S 7/4026 |
| | | | | 342/359 |
| 2012/0235851 | A1* | 9/2012 | Park | G01S 7/4052 |
| | | | | 342/70 |
| 2013/0015999 | A1* | 1/2013 | Alland | G01S 13/931 |
| | | | | 342/70 |
| 2016/0124076 | A1* | 5/2016 | Nakatani | G01S 13/931 |
| | | | | 342/174 |
| 2016/0161597 | A1* | 6/2016 | Treptow | G01S 13/424 |
| | | | | 342/174 |

FOREIGN PATENT DOCUMENTS

| | | |
|---|---|---|
| CN | 109507671 A | 3/2019 |
| CN | 110208793 A | 9/2019 |
| CN | 110431437 A | 11/2019 |
| CN | 110531336 A | 12/2019 |
| CN | 111098853 A | 5/2020 |

* cited by examiner

DEVICE AND METHOD FOR DETECTING VERTICAL MOUNTING MISALIGNMENT OF RADAR DEVICE, AND RADAR DEVICE WITH THE SAME

CROSS REFERENCE TO RELATED APPLICATION

This application claims priority from Korean Patent Application No. 10-2020-0055152, filed on May 8, 2020, which is hereby incorporated by reference for all purposes as if fully set forth herein.

TECHNICAL FIELD

An embodiment of the present disclosure relates to a device and method for detecting vertical mounting misalignment of a radar device and radar device with the same. More specifically, the embodiment of the present disclosure relates to a device and method for determining a region of interest including the ground in front by using a radar signal, calculating errors in vertical angles for each of a number of ground distances in the region of interest, and detecting vertical mounting misalignment of the radar device by using the calculated errors.

BACKGROUND

A radar device mounted in a vehicle or the like is widely used as a sensor device for vehicle control. The radar device may transmit electromagnetic waves having a predetermined frequency, receive a signal reflected from an object, and process the reception signal so as to extract the position of the object, speed information, or the like.

The vehicle radar device can provide a function to detect vertical direction information in addition to the distance, speed, and horizontal angle of the target.

In a method of acquiring vertical information such as the elevation angle of a target, it is possible to receive the reception signal reflected from the target from different transmitting and receiving antennas, and utilize the magnitude (power) of the reception signal or an array antenna in a vertical direction.

In addition, the vertical angle or vertical direction information of the target obtained from the vehicle radar device may be used for classification to determine the type of the target.

In addition, by using the vertical direction information acquisition function of the vehicle radar device, it is possible to determine an object on the vehicle, the ground, a target in the front, and the like.

Meanwhile, such a vehicle radar device is required to be mounted while having a specific vertical angle with respect to the horizontal of the vehicle.

More specifically, a vehicle radar device is required to be aligned and mounted so that the radar transmission beam is radiated symmetrically up and down around a plane forming 0 degrees in the vertical direction from the center of the radar device.

However, an abnormality may occur in the vertical alignment during mounting to the vehicle or assembly of the radar device, and in this case, there may occur a problem in that accurate vertical direction information of the target cannot be acquired.

In order to solve this problem, there is a need for a method of detecting a vertical misalignment of mounting a radar device.

Accordingly, embodiments of the present disclosure proposes a method of detecting a vertical mounting misalignment of a vehicle radar device having a simple configuration and a small amount of computation.

SUMMARY

In this background, embodiments of the present disclosure provide a device and method for detecting a vertical mounting misalignment of a vehicle radar device capable of improving an accuracy while having a simple configuration.

Embodiments of the present disclosure provide a device and method for detecting a vertical mounting misalignment of a vehicle radar device by using an estimation error between a reference vertical angle preset for each ground distance to the ground measured using radar signals and an estimated vertical angle according to the actual measured ground distance.

Embodiments of the present disclosure provide a device, method and a vehicle radar device with the same capable of extracting a ground component within the set region of interest, calculating an estimation error between an estimated vertical angle to the measured ground and the reference vertical angle set in advance corresponding to the corresponding ground distance, and detecting the vertical mounting misalignment of the radar radar device using the estimated error.

In accordance with an aspect of the present disclosure, there is provided a device for detecting a vertical mounting misalignment of a vehicle radar device including a monitoring range setter for determining a monitoring range in front of a vehicle based on a radar signal, a ground component determiner for detecting a ground component in a reflection signal from a stationary object in the monitoring range, an estimated vertical angle determiner for determining a ground distance to the detected ground component and an estimated vertical angle, an estimation error determiner for determining an estimation error that is a difference between the estimated vertical angle and a reference vertical angle set in correspondence with the corresponding ground distance, and a vertical misalignment determiner for determining whether of the vertical mounting misalignment of the vehicle radar device based on the determined estimation error.

In this case, a plurality of reference vertical angles corresponding to each of a plurality of ground distances in the monitoring range may be preset, and the estimation error determiner may extract a first reference vertical angle corresponding to the measured ground distance from among the plurality of reference vertical angle values, and determine the estimation error by comparing the first reference vertical angle with the estimated vertical angle.

In addition, the vertical misalignment determiner may utilize a first manner for determining the vertical mounting misalignment by using the estimation error which is a difference between the estimated vertical angle and the first reference vertical angle by one measurement. Alternatively, the vertical misalignment determiner may utilize a second manner for determining the vertical mounting misalignment by using statistical characteristics of the plurality of estimation errors determined by two or more measurements, or by functionalizing a cumulative distribution of the plurality of estimation errors.

Further, the estimated vertical angle determiner may determine the ground distance and the estimated vertical angle by using the radar signal transmitted and received through an antenna unit including two or more transmission antennas or receiving antennas having an offset in a vertical direction. In this case, the antenna unit may include two or more transmission antennas offset in the vertical direction and one or more receiving antennas arranged at the same position in the vertical direction, or the antenna unit includes one or more transmission antennas arranged at the same position in the vertical direction and two or more receiving antennas offset in the vertical direction.

Meanwhile, the monitoring range setter may include a range-velocity information acquisitor for extracting a range-velocity information by two-dimensional Fourier transform for a reception signal, a stationary object detector for determining a stationary object corresponding to a negative value of a vehicle speed of the vehicle from the range-velocity information, and a monitoring range determiner for determining an area of a distance including the stationary object as the monitoring range.

The ground component determiner may determine the ground component using at least one of a power level and a horizontal angle of the reflection signal from the stationary object. More specifically, the ground component determiner may determine the corresponding reflection signal as the ground component if the power level of the reflection signal is less than or equal to a first threshold value and the horizontal angle of the reflection signal is greater than or equal to a second threshold value.

In accordance with an aspect of the present disclosure, there is provided a method for detecting a vertical mounting misalignment of a vehicle radar device including determining a monitoring range in front of a vehicle based on a radar signal, detecting a ground component in a reflection signal from a stationary object in the monitoring range, determining a ground distance to the detected ground component and an estimated vertical angle, determining an estimation error that is a difference between the estimated vertical angle and a reference vertical angle set in correspondence with the corresponding ground distance, and determining whether of the vertical mounting misalignment of the vehicle radar device based on the determined estimation error.

In accordance with an aspect of the present disclosure, there is provided a vehicle radar device including an antenna unit including a transmission antenna for transmitting a transmission signal around a vehicle and a receiving antenna for receiving a reception signal reflected from an object, a controller that controls to transmit the transmission signal having a specific transmission beam pattern through the transmission antenna, and processes the reception signal received from the receiving antenna to acquire object information, and a vertical mounting misalignment detecting device including a monitoring range setter for determining a monitoring range in front of the vehicle based on a radar signal, a ground component determiner for detecting a ground component in a reflection signal from a stationary object in the monitoring range, an estimated vertical angle determiner for determining a ground distance to the detected ground component and an estimated vertical angle, an estimation error determiner for determining an estimation error that is a difference between the estimated vertical angle and a reference vertical angle set in correspondence with the corresponding ground distance, and a vertical misalignment determiner for determining whether of the vertical mounting misalignment of the vehicle radar device based on the determined estimation error.

According to an embodiment of the present disclosure as described later, it is possible to provide a device and method for detecting vertical mounting misalignment of a vehicle radar device with improved precision while having a simple configuration.

In addition, in a vehicle radar device, it is possible to accurately detect a vertical mounting misalignment of a vehicle radar device by using an estimation error between the preset reference vertical angle for each ground distance to the ground measured using a radar signal and the estimated vertical angle according to the actual measured ground distance.

More specifically, the ground component is extracted within the set region of interest, and the estimation error between the estimated vertical angle to the measured ground and the reference vertical angle set in advance corresponding to the corresponding ground distance is determined. Thus, it is possible to accurately determine the vertical mounting misalignment of the radar device using the estimation error.

DETAILED DESCRIPTION

Figure 1:
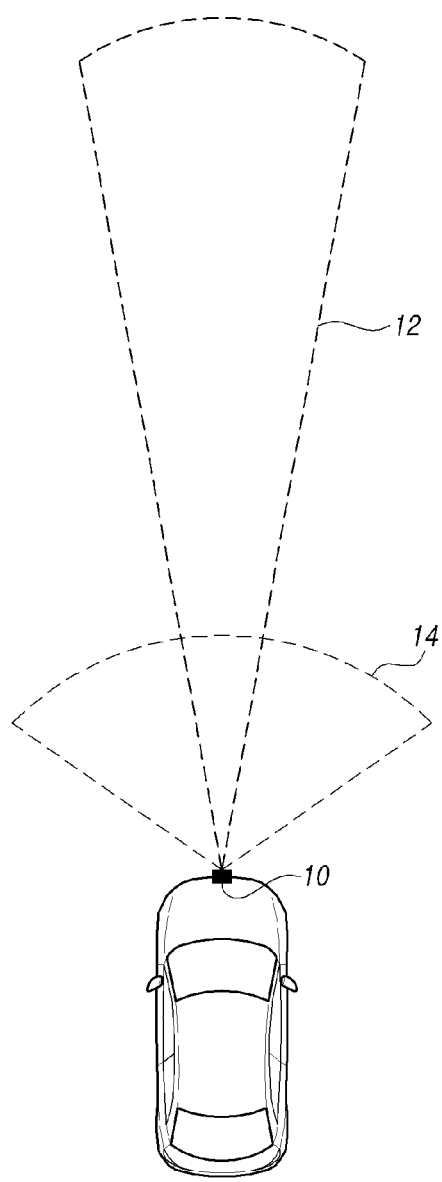
FIG. 1 illustrates an object detection method of a general vehicle radar sensor, and illustrates a medium/long-range detection area and a short-range detection area.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 illustrates an object detection method of a general vehicle radar sensor, and illustrates a medium/long-range detection area and a short-range detection area.

As shown in FIG. 1, the vehicle radar sensor is required to have both a medium/long-range detection function for detecting a long-range target in front and a short-range detection function for detecting a short-range target near the vehicle when detecting an object in the vicinity of the vehicle.

In vehicles using radar sensors, various types of driver assistance systems (DAS) may be used to assist the driver's driving.

In an adaptive cruise system (ACC) for following the preceding vehicle, it is necessary to detect a mid-to-long-range target in front of the vehicle traveling direction.

Meanwhile, in the automatic emergency braking system (AEB) or an automatic emergency steering system (AES) that for urgently braking or steering the vehicle when there is an obstacle in front, or in the lane changing assistance (LCA) system for preventing collisions with obstacles in adjacent lanes when changing lanes, it is necessary to detect near-field obstacles near the vehicle with high precision.

To this end, as shown in the upper drawing of FIG. 1, the vehicle radar device 10 may have a long-range detection area 12 having a relatively narrow detection angle and a long detection distance for mid-to-long-range sensing, and a wide sensing angle and a short-range detection area 14 having a wide detection angle and a small detection distance.

Such a radar device for a vehicle may be required to transmit the transmission signal in a mid-to-long-range transmission beam pattern for mid-to-long-range detection, and to transmit the transmission signal in a short-range transmission beam pattern different from a medium-to-long range transmission beam pattern for short-range detection.

In this way, in vehicle radar device, it is necessary to integrate medium/long-range radar and short-range radar. In addition, in order to integrate medium/long-range radar and short-range radar, it is possible to use a configuration in which the transmission antenna is different and the receiving antenna is shared.

The vehicle radar device can provide a function to detect vertical direction information in addition to the distance, speed, and horizontal angle of the target.

In order to estimate the elevation angle, it is possible to receive the reception signal reflected from the target from different transmitting and receiving antennas, and utilize the power of the reception signal or an array antenna in a vertical direction.

The elevation angle information of the target obtained from the vehicle radar device may be used for classification to determine the type of the target.

That is, it is possible to determine an object on the vehicle, the ground, a target in the front, and the like. In addition, it is possible to estimate the vertical mounting angle of the radar sensor mounted on the vehicle from the elevation angle of the target, and if necessary, it is possible to inform the driver of the deterioration of sensor detection performance due to the sensor mounting misalignment.

Figure 2:
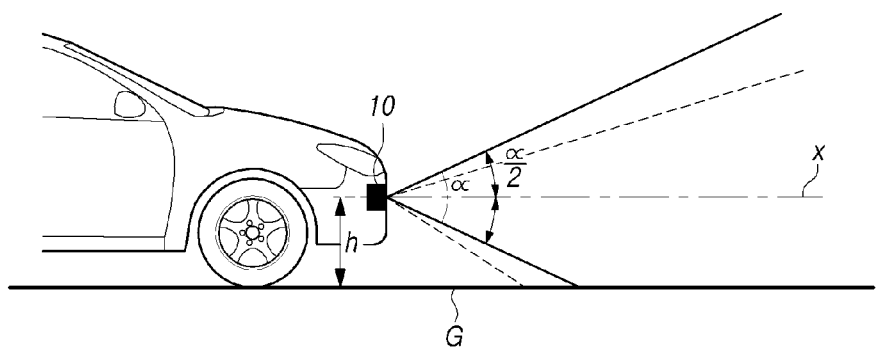
FIG. 2 illustrates a vertical mounting alignment and misalignment state of a vehicle radar device.

FIG. 2 illustrates a vertical mounting alignment and misalignment state of a vehicle radar device.

A vehicle radar device may be mounted on the front of the vehicle, such as inside the front grille of the vehicle, and therefore, it is required to be accurately aligned when mounted.

That is, the transmission/reception beam of the vehicle radar device may have a certain pattern, and in particular, may have a certain beam width.

More specifically, the radar beam has a constant beam angle range in the vertical and horizontal directions, and these can be expressed as a horizontal beam angle range and a vertical beam angle range, respectively.

In general, if the radar device is normally mounted on a vehicle, the main axis or optical axis of the radar beam is parallel to the ground.

As shown in FIG. 2, if the radar 10 is normally mounted on the vehicle, the radar beam is directed in a direction parallel to the ground G at the mounting height (h) of the radar device, thus the radar optical axis X is parallel to the ground and has a beam width equal to ½ of the vertical beam angular range $\alpha$ in the vertical direction, respectively. (Solid line represented)

However, if the radar is misaligned and mounted in the vertical direction, as shown by a dotted line, unlike a normal radar beam (solid line), a radar beam pattern may be vertically directed upward or downward.

In such a state of the vertical mounting misalignment, an error may occur in obtaining vertical information of the target, which degrades the target detection performance of the radar device.

In particular, in an autonomous driving vehicle under development recently, if the vertical direction detection performance of the radar device, which is one of the detection sensors, decreases, errors may occur in the distance to the target, vertical position, etc., which may cause a serious danger.

Therefore, as shown in FIG. 2, if a misalignment in the vertical direction occurs when mounting the radar, it is required to notify the driver and take appropriate measures for alignment, or even better, perform a specific compensation when obtaining vertical information of the target.

Meanwhile, in order to detect such a vertical mounting misalignment of the radar device, it has been proposed a method of detecting the ground with a radar device and using the distance to the ground.

However, due to the slope of the road corresponding to the ground, the non-uniformity of the road surface in front of the vehicle, and the non-uniformity of the radar beam width, it may not be possible to accurately determine the vertical mounting misalignment by simply comparing the distance to the front ground (road) and the vertical angle of the ground with a reference value.

Accordingly, in embodiments of the present disclosure, there proposes a method for accurately detecting a vertical mounting error of the vehicle radar device.

Figure 3:
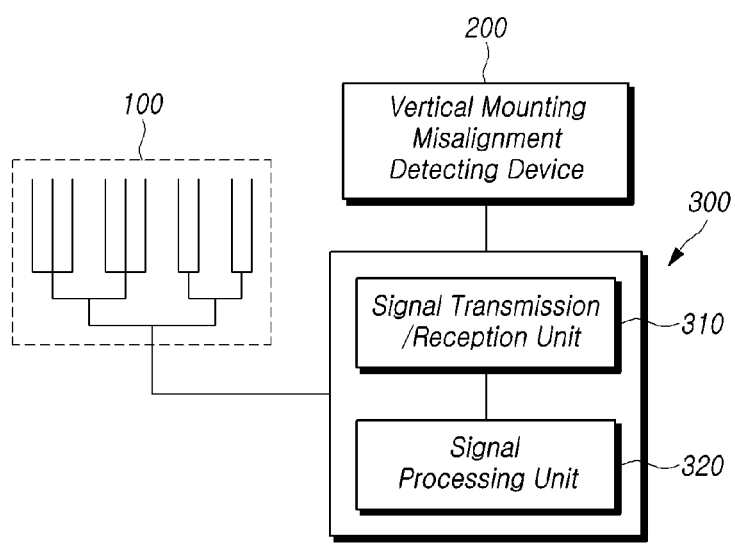
FIG. 3 illustrates a configuration of a vehicle radar device according to an embodiment of the present disclosure.
Figure 4:
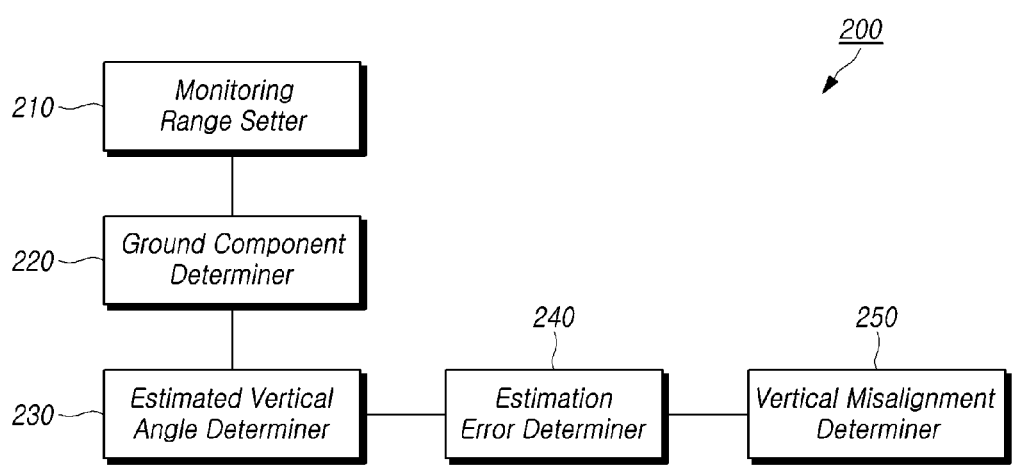
FIG. 4 is a block diagram illustrating a configuration of a device for detecting a vertical mounting misalignment for a vehicle radar device according to an embodiment of the present disclosure.

FIG. 3 illustrates a configuration of a vehicle radar device according to an embodiment of the present disclosure, and FIG. 4 is a block diagram illustrating a configuration of a device for detecting a vertical mounting misalignment for a vehicle radar device according to an embodiment of the present disclosure.

Referring to FIG. 3 and FIG. 4, a radar device for a vehicle according to an embodiment of the present disclosure may include an antenna unit 100 including a transmission antenna and a receiving antenna, a controller 300 as a signal processing unit that controls the transmission and reception of radar signals and processes the reception signals to obtain object information, and a vertical mounting misalignment detecting device 200 for detecting vertical mounting misalignment of the radar device by processing radar reception signal.

The antenna unit 100 may include a transmission antenna for transmitting a transmission signal around the vehicle and a receiving antenna receiving a reception signal reflected from an object.

According to the present embodiment, one of the transmission antenna and the receiving antenna included in the antenna unit 100 may include two or more array antennas having an offset in the vertical direction.

More specifically, the antenna unit 100 may include two or more transmission antennas offset in the vertical direction and one or more receiving antennas arranged at the same position in the vertical direction, or the antenna unit 100 may include one or more transmission antennas arranged at the same position in the vertical direction and two or more receiving antennas offset in the vertical direction.

A detailed configuration of the antenna unit used in the radar device according to the present embodiment will be described in more detail below with reference to FIGS. 5 and 6.

The controller 300 as a signal processing unit may control to transmit the transmission signal having a specific transmission beam pattern through the transmission antenna unit, and processes the reception signal received from the receiving antenna to acquire object information.

The controller 300 may be expressed in other terms such as a control unit and a signal processor, and may be implemented in the form of a digital signal processor (DSP).

The controller 300 may control to transmit a signal through the transmission antenna and to receive a reception signal reflected from the object through the receiving antenna. The controller may calculate information about the object, that is, information such as distance, speed, and angle of the object based on the reception signal.

Meanwhile, the radar sensor device may be classified into a pulse type, a frequency modulation continuous wave (FMCW) type, and a frequency shift keying (FSK) type according to the signal type.

Among them, the FMCW type radar apparatus may use a chirp signal or a ramp signal, which is a signal whose frequency increases with time, and may determine the object's information by using time difference between the transmission wave and the reception wave and the doppler frequency shift.

More specifically, the controller 300 of the radar device may include the signal transmission/reception unit 310 for controlling signal transmission/reception through a transmission/receiving antenna, and the signal processing unit 320 for calculating target information (position, distance, angle, etc.) by using the transmission signal and the reflected signal received from the receiving antenna.

The signal transmission/reception unit 310 may include the transmission unit or the transmitter and the reception unit or the receiver, and the transmission unit may include an oscillator for supplying a signal to each transmission antenna to generate a transmission signal. The oscillator may include, for example, a voltage-controlled oscillator (VCO).

The reception unit included in the signal transmission/reception unit 310 may include a low noise amplifier (LNA) for low-noise amplification of the reflection signal received through the receiving antenna, and a mixer for mixing the low-noise amplified reception signal, an amplifier for amplifying the mixed reception signal, and an analog digital converter (ADC) for generating reception data by digitally converting the amplified reception signal.

The signal processing unit 320 may include a first processing unit and a second processing unit. The first processing unit, as a pre-processor for the second processing unit, may acquire the transmission data and reception data, control the generation of the transmission signal in the oscillator based on the acquired transmission data, synchronize transmission data and reception data, and perform the frequency-conversion of the transmission data and reception data.

The second processing unit is a post-processor that performs actual processing using the processing result of the first processing unit. The second processing unit may perform a CFAR (Constant False Alarm Rate) calculations, tracking calculations, target selection calculations based on the received data frequency converted by the first processing unit so as to extract angle information, speed information, and distance information for a target. However, the present disclosure is not limited thereto, and if information on a target can be extracted, the technical idea according to the present disclosure may be applied.

The first processing unit may perform frequency conversion after data buffering the acquired transmission data and the acquired reception data in a unit sample size that can be processed per cycle. The frequency conversion performed by the above-described first processing unit may be implemented by using a Fourier transform such as a Fast Fourier Transform (FFT).

The second processing unit may perform a second Fourier transform on a first Fourier transform (FFT) signal performed by the first processing unit, and the second Fourier transform may be, for example, a Discrete Fourier Transform (DFT), in particular, a chirp-discrete Fourier transform (Chirp-DFT).

The second processing unit may acquire frequency values corresponding to the number of times corresponding to the second Fourier transform length K through the second Fourier transform such as Chirp-DFT. The second processing unit may detect an object by calculating the beat frequency with the greatest power during each chirp period based on the obtained frequency value, and obtaining speed information and distance information of the object based on the calculated beat frequency.

As shown in FIG. 3, the vertical mounting misalignment detecting device 200 according to the present embodiment may include a monitoring range setter 210, a ground component determiner 220, an estimated vertical angle determiner 230, an estimation error determiner 240, a vertical misalignment determiner 250, and the like.

The monitoring range setter 210 may determine a monitoring range in front of the vehicle, and appropriately select the monitoring range, which is an area in which the ground used for vertical mounting misalignment determination according to the present embodiment may exist. The monitoring range may be a region of interest (ROI), which is a certain area including the ground. In this specification, the monitoring range may be referred as also the region of interest (ROI).

Figure 7:
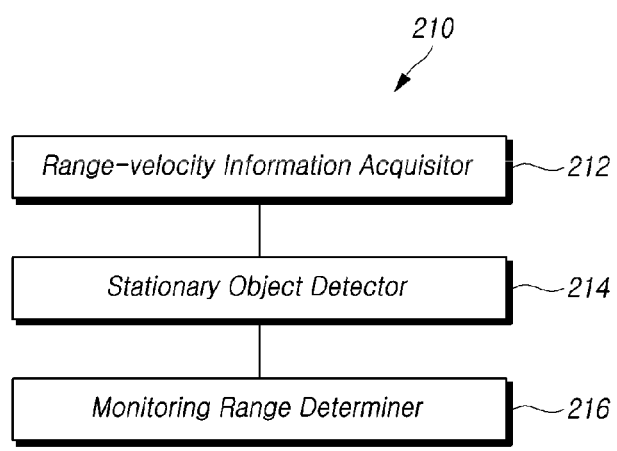
FIG. 7 illustrates a detailed configuration of a monitoring range setter included in a device for detecting a vertical mounting misalignment for a vehicle radar device according to an embodiment of the present disclosure.
Figure 8:
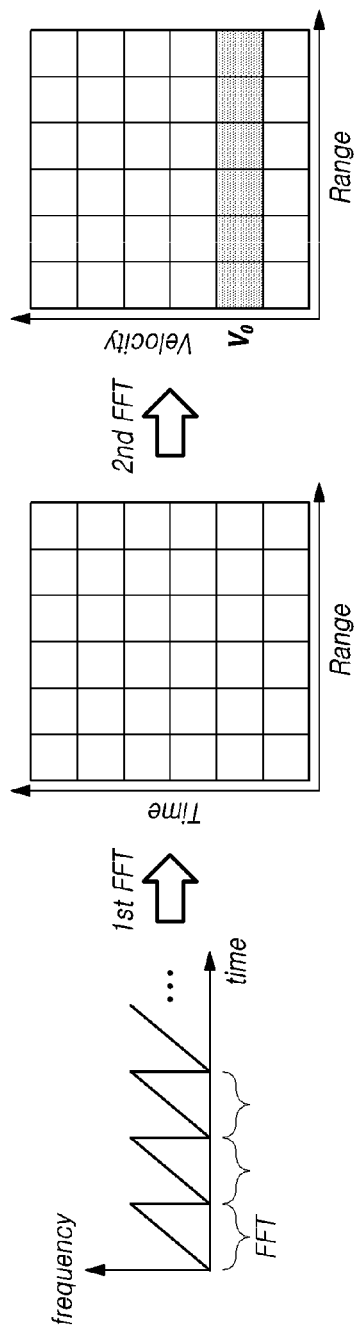
FIG. 8 illustrates a method of obtaining range-velocity information by a monitoring range setter according to an embodiment of the present disclosure.

FIG. 7 illustrates a detailed configuration of a monitoring range setter included in a device for detecting a vertical mounting misalignment for a vehicle radar device according to an embodiment of the present disclosure, and FIG. 8 illustrates a method of obtaining range-velocity information by a monitoring range setter according to an embodiment of the present disclosure.

Referring to FIG. 7, the monitoring range setter 210 included in a vertical mounting misalignment detecting device according to an embodiment may include a range-velocity information acquisitor 212 for extracting a range-velocity information by two-dimensional Fourier transform for a reception signal, a stationary object detector 214 for determining a stationary object corresponding to a negative value of a vehicle speed of the vehicle from the range-velocity information, and a monitoring range determiner 216 for determining an area of a distance including the stationary object as the monitoring range.

As shown in FIG. 8, the range-velocity information acquisitor 212 may perform a first fourier transform (1st FFT) on the reception signal for a fast time to obtain a time component according to a distance, and may perform a second fourier transform (2nd FFT) for a slow time and compress a signal existing at each distance according to a velocity to determine the range-velocity information.

More specifically, the range-velocity information acquisitor 212, as shown on the left side of FIG. 8, may perform a first Fourier transform (1st FFT), which is a fast Fourier transform, on a radar reception signal including a fast ramp or a fast chirp to calculate a range-time graph, which is a time component according to a range.

Next, the range-velocity information acquisitor 212 may perform a second Fourier transform on a range-time component, and may calculate a range-velocity graph representing speed information according to the distance as shown in the right side of FIG. 8.

The speed information v0 according to the distance of an object existing around the vehicle may be obtained by using such a range-velocity information.

The vertical mounting misalignment detecting device 200 according to an embodiment utilize a ground distance which is a distance from the radar mounting position to the ground, and a reference vertical angle set for each ground distance, and for this purpose, it is required to first detect a stationary object including the ground.

The stationary object detector 214 included in the monitoring range setter 210 may perform a function for detecting a stationary object based on a range-velocity information calculated by the range-velocity information acquisitor 212.

More specifically, the stationary object detector 214 may determine a target having a speed component corresponding to a negative value of the vehicle speed among several targets from the acquired range-velocity information as the stationary object.

Such a stationary object may include all of the stationary pedestrians, vehicles, structures, etc. in front of the vehicle in addition to the ground.

Meanwhile, the monitoring range determiner 216 included in the monitoring range setter 210 may set a specific area that may include the ground among the stationary objects detected by the stationary object detector 214 as a region of interest.

The monitoring range or region of interest (ROI) may be defined as a certain distance area in front of the vehicle which can include the ground. the monitoring range determiner 216 may set the monitoring range or the region of interest based on, in addition to the detected stationary object, a radar vertical mounting range (e.g., a mounting height from the ground to a position where the radar is mounted), and a radar beam width or a radar beam vertical angle range $\alpha$, etc.

The region of interest set in this way may be used as a range for setting a reference vertical angle for each of a plurality of ground distances used for determination of vertical mounting misalignment.

That is, in the case that the region of interest is set to 4 to 10 m in front of the vehicle, a plurality of ground distances Ri within a range of 4 to 10 m may be set, and a reference vertical angle for each ground distance may be calculated and set in advance.

The ground component determiner 220 included in the vertical mounting misalignment detecting device 200 according to the present embodiment may perform a function of detecting a ground component among reflection signals from a stationary object in the region of interest.

Figure 9:
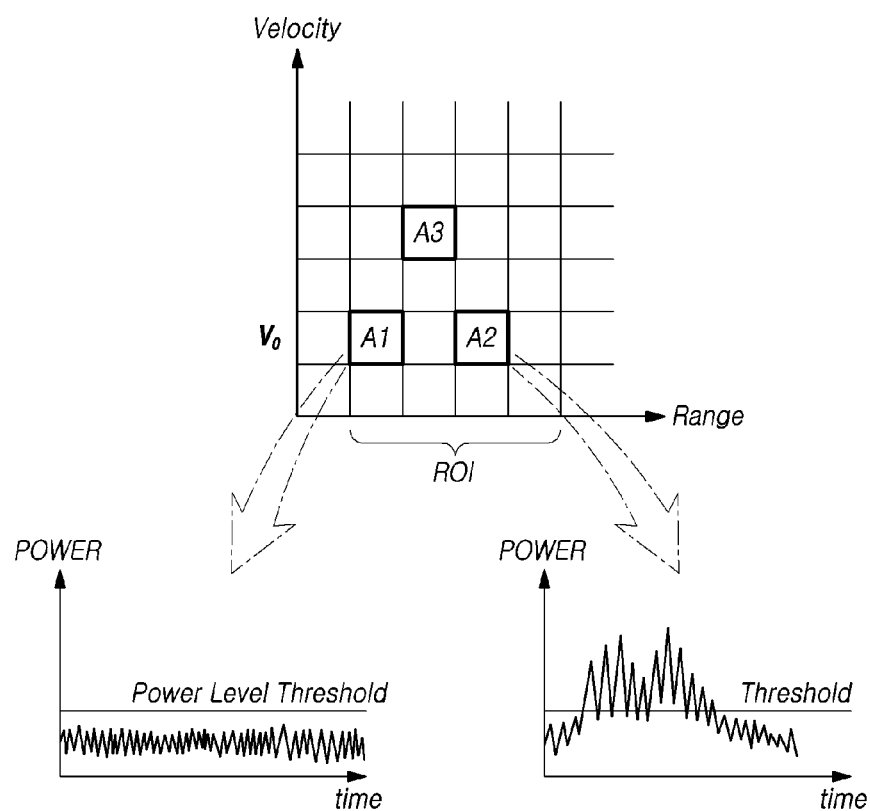
FIG. 9 and FIG. 10 illustrate a principle of a ground component determiner according to the present embodiment detecting a ground component from a reflection signal of a stationary object.
Figure 10:
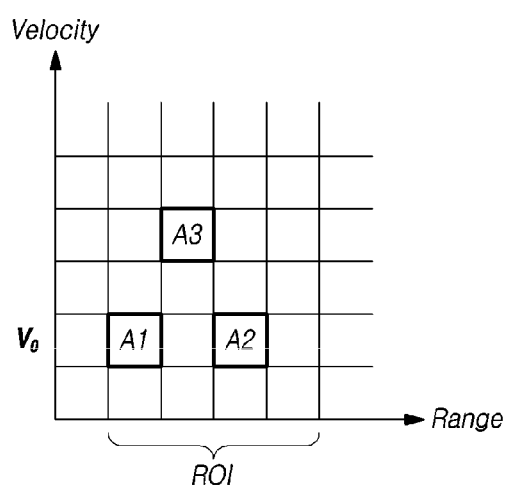
Figure 10:
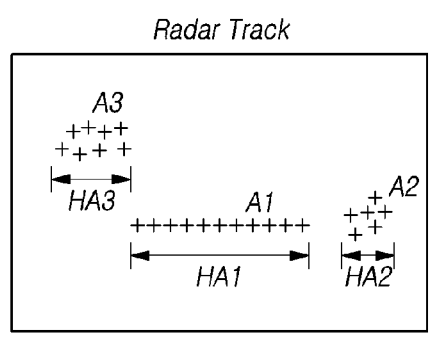

FIG. 9 and FIG. 10 illustrate a principle of a ground component determiner according to the present embodiment detecting a ground component from a reflection signal of a stationary object.

The stationary object detected by the stationary object detector 214 may include all of the stationary pedestrians, vehicles, structures, etc., in addition to the ground, and it is required to separate only the ground component used for determining the vertical mounting misalignment.

To this end, the ground component determiner 220 may determine a ground component by using at least one of a power level and a horizontal angle of the reflection signal from one or more detected stationary objects.

For example, the ground component determiner 220 may determine the corresponding reflection signal as the ground component if the power level of the reflection signal is less than or equal to a first threshold value and the horizontal angle of the reflection signal is greater than or equal to a second threshold value. Alternatively, the ground component determiner 220 may determine the corresponding reflection signal as the ground component if the horizontal angle of the reflection signal is greater than or equal to a second threshold value even though the power level of the reflection signal is equal to or greater than the first threshold value.

As shown in FIG. 9, the ground component determiner 220 may determine a stationary object signal whose power is equal to or less than a preset power level threshold value (first threshold value) among a plurality of stationary object signal components in the region of interest as a ground component.

Referring to FIG. 9, a plurality of targets A1, A2, and A3 in the region of interest are identified in a graph representing the range-velocity information calculated by the range-velocity information acquisitor 212.

Among the targets, targets having a speed component of v0 corresponding to a negative value of a vehicle speed are A1 and A2, and these two targets may be determined as stationary objects.

Among the two stationary objects A1 and A2, A1 has a power equal to or less than a power level threshold (first threshold value), and A2 has a power equal to or greater than a power level threshold (first threshold value), and thus the ground component determiner 220 may determine A1 as the ground component among the stationary object components A1 and A2.

In addition, the ground component determiner 220 may determine a stationary object signal having a horizontal angle range of an obstacle equal to or greater than a second threshold value, which is a specific angular range threshold, as a ground component among a plurality of stationary object signal components in the region of interest.

As shown in FIG. 10, as a result of checking the radar track, among the stationary objects A1 and A2 in the region of interest, A1 has a horizontal angle range of HA1, and A2 has a horizontal angle range of H2.

Among these, $A1$ having a horizontal angle range HA greater than a specific second threshold value is determined as a ground component.

In general, since the radar transmission signal is incident on the ground at an angle, the intensity of the signal reflected from the ground is weaker than that of other stationary objects such as pedestrians, vehicles, and structures.

In addition, the ground has a larger horizontal angular range than other stationary obstacles (vehicles, pedestrians, etc.).

Accordingly, in this embodiment, the ground component determiner 220 may determines the corresponding reflection signal as the ground component if the power level of the reflection signal is less than or equal to a first threshold value and the horizontal angle of the reflection signal is greater than or equal to a second threshold value, among a plurality of stationary object components in the region of interest.

However, in the case that the power level of the reflection signal is greater than or equal to the first threshold value, the reflection signal may be a ground component. Accordingly, even if the power level of the reflection signal is greater than or equal to the first threshold value, the ground component determiner 220 may determine the corresponding reflection signal as the ground component if the horizontal angle of the reflection signal is greater than or equal to the second threshold value.

The estimated vertical angle determiner 230 included in the vertical mounting misalignment detecting device 200 according to an embodiment may calculate a ground distance to the detected ground component and an estimated vertical angle.

The estimated vertical angle determiner 230 may calculate the ground distance to the ground component and the estimated vertical angle by using the vertical arrangement of two or more transmission or receiving antennas, and specifically, by using the phase difference between the corresponding reception signals.

To this end, one of the transmission antenna and the receiving antenna included in the antenna unit 100 included in the vehicle radar device according to the present embodiment may be configured to include two or more array antennas having an offset in the vertical direction.

Figure 5:
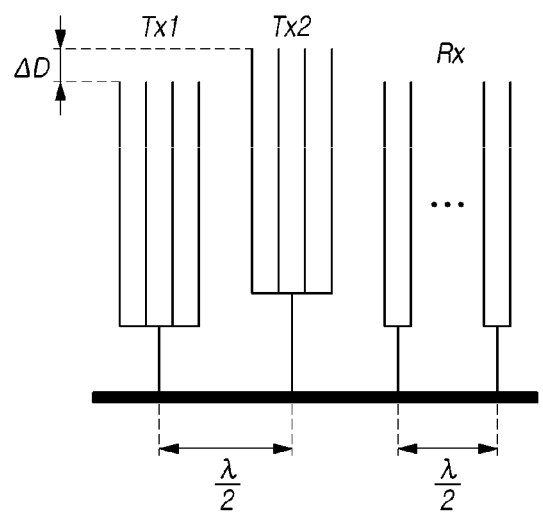
FIG. 5 illustrates an embodiment of an antenna unit included in the vehicle radar device according to an embodiment of the present disclosure.
Figure 6:
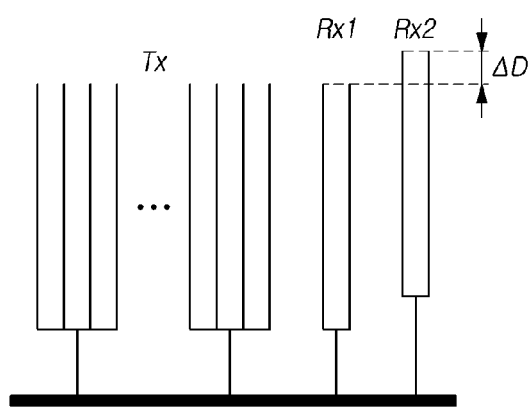
FIG. 6 illustrates another embodiment of an antenna unit included in the vehicle radar device according to an embodiment of the present disclosure.

FIG. 5 and FIG. 6 illustrate several embodiments of an antenna unit included in the vehicle radar device according to an embodiment of the present disclosure.

According to an embodiment of FIG. 5, the antenna unit 100 may include two transmission antennas Tx1, Tx2 and a plurality of receiving antennas Rx. The two transmission antennas Tx1 and Tx2 are vertically spaced apart by a specific distance ΔD, and the plurality of receiving antennas Rx all have the same vertical position.

Each of the transmission antenna and the receiving antenna may have a structure in which 2, 4, or 6 array antennas extend to one direction while having one feed point, but is not limited thereto.

Each of the array antennas constituting the transmission antenna and receiving antennas may be composed of a plurality of elements or patches connected to the output line of the distributor, may extend in an upper direction (upper direction among the vertical directions) with a feed port connected to a chip including a controller or an input port of a distributor as a starting point.

In addition, the two transmission antennas Tx1 and Tx2 constituting the transmission antenna unit may be arranged to be spaced apart by a half of the transmission signal wavelength 0.5λ in the horizontal direction (second direction) perpendicular to the vertical direction (first direction), which is the extension direction of each array antenna. In addition, the plurality of receiving antennas Rx constituting the receiving antenna unit may also be arranged to be spaced apart by a half 0.5λ of the wavelength of the transmission signal.

In this way, by setting the horizontal distance between the transmission antenna or the receiving antenna as a half 0.5λ of the wavelength of the transmission signal, it is possible to remove the angle ambiguity caused by the grating lobe.

That is, the grating lobe may occur because the distance between the receiving antennas is more than half 0.5λ of the wavelength of the transmission signal. However, it is possible to minimize angle ambiguity due to the grating lobe by arranging the horizontal distance between the receiving antennas at 0.5λ, and comparing and compensating the angle information extracted from the channels of each receiving antenna.

In addition, as shown in FIG. 5, since the two transmission antennas Tx1 and Tx2 are vertically offset by a specific distance, there may be a phase difference due to the vertical offset between the first reception signal which is transmitted from Tx1 and received from the receiving antenna and the second reception signal which is transmitted from Tx2 and received from the receiving antenna.

Therefore, the ground distance Ri, which is the distance to the ground component, may be calculated by using the time difference between the transmission time and the reception time, and the estimated vertical angle θi to the ground may be calculated by using the phase difference between the transmission signal, the first received signal, and the second received signal.

According to an embodiment of FIG. 6, the antenna unit 100 may include a plurality of transmission antennas Tx and two receiving antennas Rx1 and Rx2. The plurality of transmission antennas Tx are arranged at the same position in the vertical direction, and the two receiving antennas Rx1 and Rx2 are arranged to be spaced apart by a predetermined distance ΔD in the vertical direction.

Since the shapes and arrangements of other transmission and receiving antennas are the same as configuration of the embodiment of FIG. 5, it will be omitted detailed descriptions.

In addition, as shown in FIG. 6, since the two receiving antennas Rx1 and Rx2 are vertically offset by a specific distance, there may be a phase difference due to the vertical offset between the first reception signal which is transmitted from Tx1 and received from the receiving antenna Rx1 and the second reception signal which is transmitted from Tx and received from the receiving antenna Rx2.

Therefore, the ground distance Ri, which is the distance to the ground component, may be calculated by using the time difference between the transmission time and the reception time, and the estimated vertical angle θi to the ground may be calculated by using the phase difference between the transmission signal, the first received signal, and the second received signal.

In addition, the radar device according to the present embodiment may modulate and utilize a radar signal transmitted/received from a transmission antenna or a receiving antenna offset in a horizontal direction by using different modulation methods in order to accurately calculate the estimated vertical angle for each ground distance.

The estimation error determiner 240 included in the vertical mounting misalignment detecting device 200 according to the present embodiment may calculate an estimation error which is a difference between the reference vertical angle set in correspondence with the measured ground distance and the estimated vertical angle.

Figure 11:
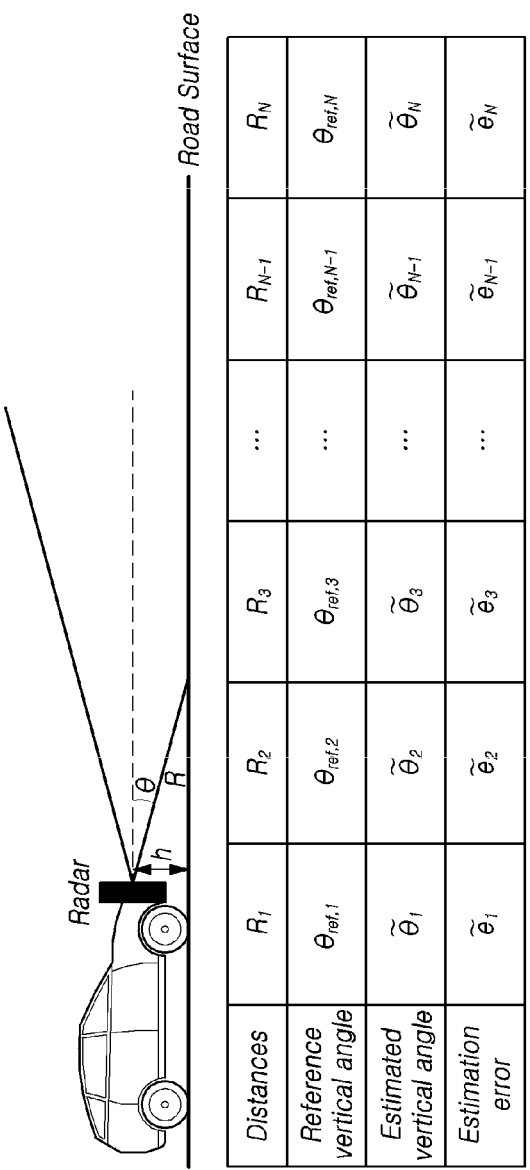
FIG. 11 illustrates an example of a reference vertical angle set for each ground distance, an estimated vertical angle, and an estimation error according to an embodiment of the present disclosure.

FIG. 11 illustrates an example of a reference vertical angle set for each ground distance, an estimated vertical angle, and an estimation error according to an embodiment of the present disclosure.

As shown in FIG. 11, a reference vertical angle $\theta_{ref,i}$ according to the mounting height h of a radar device is pre-set for a plurality of ground distances Ri within the region of interest.

The reference vertical angle $\theta_{ref,i}$ may be calculated by the following Equation 1.

$$\theta_{ref,i} = \arcsin(h/Ri) \quad \text{[Equation 1]}$$

In Equation 1, h is the mounting height of the radar device or the height from the ground to the center of the radar beam, and Ri is the ground distance from the center of the radar device to the ground.

This reference vertical angle $\theta_{ref,i}$ may be defined as a vertical angle from the center of the radar device to the ground corresponding to the ground distance Ri in the case that the radar device is normally installed at a vertical 0 degree (i.e., horizontal direction).

In addition, the estimated vertical angle means the vertical angle to the actually measured ground.

The estimation error $\tilde{e}i$ may be defined as a difference between a preset reference vertical angle and a measured estimated vertical angle, and may be defined as $\hat{\theta}i\_\theta_{ref,i}$.

This estimation error $\tilde{e}i$ may be measured for each of a plurality of ground distances Ri.

The reference vertical angle set for each ground distance as shown in FIG. 11 may be determined and stored in the form of a lookup table in advance, but is not limited thereto, and may be calculated and used in real time according to the mounting height of the radar device.

As described above, the estimation error determiner 240 according to the present embodiment may calculate an estimation error, which is a difference between a preset reference vertical angle and an actually measured estimated vertical angle corresponding to the measured ground distance.

That is, the estimation error determiner 240 calculates a ground distance Ri, which is a measurement distance to a ground component, and an estimated vertical angle by processing of the reflection signal received using the above-described vertical offset antenna, and may determine the estimation error by comparing with the reference vertical distance for the corresponding ground distance Ri included in the setting information as shown in FIG. 11.

The vertical misalignment determiner 250 included in the vertical mounting misalignment detecting device 200 according to the present embodiment determines whether of the vertical mounting misalignment of the vehicle radar device based on the determined estimation error Specifically, the vertical misalignment determiner 250 may use a misalignment determination algorithm for determining vertical misalignment using an estimation error.

The misalignment determination algorithm may be implemented in one of a first manner using only a single estimation error specified by one measurement or within one frame, and a second manner using a plurality of estimation errors specified in two or more measurements or in a plurality of frames.

According to the first manner, the vertical misalignment determiner 250 may determine that misalignment has occurred in the vertical mounting of the radar device if the magnitude of the estimation error measured in one frame is outside a predetermined threshold range.

In this case, the threshold range, which is a reference value for determining vertical mounting misalignment, may be differently set for each of a plurality of ground distances, similar to the reference vertical angle.

For example, if the estimation error $\tilde{e}i$ determined for the ground distance Ri is 0.1 degrees, and the threshold range for misalignment determination set for the corresponding ground distance is 0.08 degrees, the vertical misalignment determiner 250 may determine that the misalignment has occurred in the vertical mounting of the radar device.

According to the second manner, the vertical misalignment determiner 250 may use statistical characteristics of a plurality of estimation errors calculated from two or more measurements or two or more frames, or the vertical misalignment determiner 250 may determine the vertical mounting misalignment by functionalizing the cumulative distribution of the plurality of estimation errors.

The ground distance Ri may be measured differently for each measurement depending on the non-uniformity of the ground or a minute change in the radar beam width.

Accordingly, in this case, in order to accurately determine the vertical mounting misalignment, it is possible to determine the vertical mounting misalignment using statistical characteristics between estimation errors for each ground distance measured in a plurality of frames.

For example, as the ground distance Ri increases, the estimation error increases. Therefore, if the estimation error increases together with the increase of the ground distance for estimation errors measured in multiple frames, it can be determined that vertical mounting misalignment has occurred.

In contrary, as a result of analyzing statistical characteristics between estimation errors measured in multiple frames, if the first estimation error at a larger ground distance is smaller than the second estimation error at a smaller ground distance, it can be determined that the calculated estimation error is inaccurate, and thus the misalignment determination can be withheld.

In addition, if the ground and the radar beam width are uniform, the reference ground distance Ri may be uniquely determined, and the estimation error may have a form of a normal distribution around the reference ground distance Ri.

Therefore, it may be determined as vertical misalignment only when the estimation error measured in a plurality of frames has a relationship of a normal distribution around the reference ground distance.

In order to determine the vertical misalignment according to the second manner, the amount of change in the estimation error may be filtered (for example, a moving average filter).

In addition, the misalignment may be determined by defining the estimation error as one random variable or a random process, and calculating and analyzing its a mean, variance, or moment of 3rd or higher order.

Alternatively, the misalignment may be determined by analyzing matching information with a specific random variable for the histogram of a plurality of estimation errors by using a matrix. The misalignment may be determined according to a degree of fit with a predetermined Gaussian distribution.

In addition, the vertical misalignment determiner 250 may improve accuracy by excluding an estimation error which is out of a specific allowable range among the calculated estimation errors from the determination target.

For example, if the allowable range of the estimation error is 0.2 degrees, and the measured estimation error is 0.3 degrees or more, the corresponding estimation error is excluded from the determination target for the vertical misalignment determination. In the case where the tendency of the accumulated error values changes rapidly, such as a case where the mounting distortion suddenly changes significantly due to an impact, the estimation error may be excluded from the determination target. As described above, according to an embodiment, by determining the vertical misalignment using the estimation error calculated for a number of ground distances, it is possible to accurately determine the vertical misalignment of the radar device even if there is a road surface non-uniformity, road slopes, and changes in radar beam width.

The controller 300 included in the radar device according to embodiments of the present disclosure, the vertical mounting misalignment detecting device 200, or the monitoring range setter 210, the ground component determiner 220, and the estimated vertical angle determiner 230, the estimation error determiner 240 and the vertical misalignment determiner 250 as described above may be implemented as a module in a radar control device for a vehicle or an ECU.

Such a radar control device or ECU may include a processor, a storage device such as a memory, and a computer program capable of performing a specific function. In addition, the above-described controller 300, the vertical mounting misalignment detecting device 200, or the monitoring range setter 210, the ground component determiner 220, and the estimated vertical angle determiner 230, the estimation error determiner 240 and the vertical misalignment determiner 250 may be implemented as software modules capable of performing respective corresponding functions.

That is, the above-described controller 300, the vertical mounting misalignment detecting device 200, or the monitoring range setter 210, the ground component determiner 220, and the estimated vertical angle determiner 230, the estimation error determiner 240 and the vertical misalignment determiner 250 according to the present embodiment may be implemented as corresponding software modules and stored in a memory. In addition, each software module can be executed in a processing unit such as an ECU at a specific timing.

Figure 12:
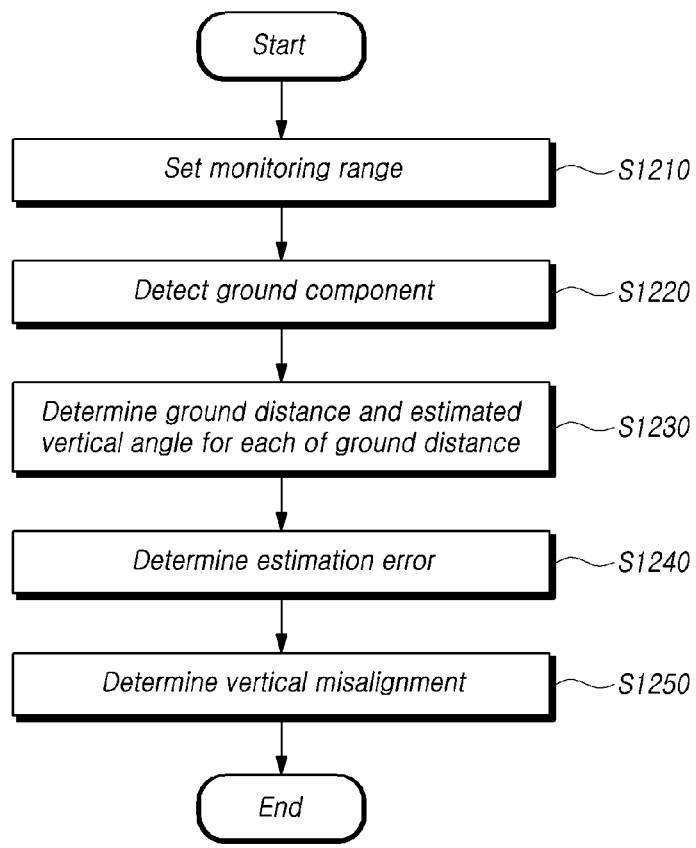
FIG. 12 is a flowchart illustrating the overall flow of the vertical mounting misalignment detection method according to an embodiment of the present disclosure.

FIG. 12 is a flowchart illustrating the overall flow of the vertical mounting misalignment detection method according to an embodiment of the present disclosure.

Referring to FIG. 12, the vertical mounting misalignment detecting method according to an embodiment of the present disclosure may include determining a monitoring range in front of a vehicle based on a radar signal (S1210), detecting a ground component in a reflection signal from a stationary object in the monitoring range (S1220), determining a ground distance to the detected ground component and an estimated vertical angle (S1230), determining an estimation error that is a difference between the estimated vertical angle and a reference vertical angle set in correspondence with the corresponding ground distance (S140), and determining whether of the vertical mounting misalignment of the vehicle radar device based on the determined estimation error (S1250).

The vertical mounting misalignment detecting method according to the present embodiment may be performed by the vertical mounting misalignment detecting device described in FIGS. 3 to 11, and a specific configuration thereof is the same as described above.

The antenna unit used in the radar device according to the present embodiment is not limited to the configuration as described above.

That is, it may be used another structure in which the antenna unit according to the present embodiment includes one or more transmission antennas for transmitting the transmission signal and one or more receiving antennas for receiving the reception signal reflected from the target.

In addition, the radar device according to the present embodiments can employ a signal transmission and reception technique based on a multidimensional antenna array and a multiple input multiple output (MIMO) in order to form a virtual antenna aperture greater than an actual antenna aperture.

For example, a two-dimensional antenna array can be employed to accomplish the accuracy of an angle to the vertical and/or the horizontal and a higher resolution. In case the two-dimensional radar antenna array is used, signals are transmitted and received by two separate scans (time multiplexed) horizontally and vertically, and the MIMO can be used separately from the horizontal and vertical scans (time multiplexed) by the two-dimensional antenna array.

More specifically, the radar device according to one or more embodiments can comprise a two-dimensional antenna array including a transmission antenna assembly including a total of 12 transmission antennas Tx and a receiving antenna assembly including a total of 16 receiving antennas Rx; as a result, a total of 192 virtual receiving antennas can be arranged.

Further, in another embodiment, in a case where the antenna assembly of the radar sensor comprises the two-dimensional antenna array, each antenna patch can be disposed in a diamond or rhombus shape; therefore, unnecessary side lobes can be reduced.

Alternatively, the two-dimensional antenna arrangement can comprise a V-shape antenna array in which a plurality of radiating patches is arranged in a V-shape, and more specifically, comprise two V-shape antenna arrays. In this case, a single feed is performed to the apex of each V-shape antenna array.

Alternatively, the two-dimensional antenna arrangement can comprise a X-shape antenna array in which a plurality of radiating patches is arranged in a X-shape, and more specifically, comprise two X-shape antenna arrays. In this case, a single feed is performed to the center of each X-shape antenna array.

Further, the radar device according to one or more embodiments can employ the MIMO antenna system to accomplish the accuracy of an angle to the vertical and/or the horizontal and a higher resolution.

More specifically, in the MIMO system, each transmission antenna can transmit a signal with a waveform independent of one another. That is, each transmission antenna can transmit a signal with a waveform independent of the other transmission antenna(s), and then each receiving antenna can determine which transmission antenna a received signal from an object is transmitted from due to the using of the independent waveform for each transmission antenna.

Further, the radar device according to one or more embodiments can comprise a radar housing in which a substrate on which the antenna assembly is disposed and a circuitry are accommodated, and a radome served as an enclosure of the radar housing. The radome can be formed of a material capable of decreasing attenuation of radar signals transmitted and received, and constitute a front or rear bumper, a grille, or a side body of the vehicle, or an exterior surface of one or more components of the vehicle.

That is, the radome of the radar device can be disposed inside of the bumper, the grille, or the body of the vehicle, or be disposed as a part of a component constituting the exterior surface of the vehicle, such as a part of the bumper, the grille, or the body of the vehicle. Therefore, the radome can improve the aesthetics of the vehicle and provide the convenience of mounting the radar sensor.

The radar sensor or the radar device/system according to the present disclosure can comprise one or more of a front detection radar sensor mounted in the front of the vehicle, a rear detection radar sensor mounted in the rear of the vehicle, and a side or side-rear detection radar sensor mounted in a side of the vehicle, which can constitute at least one radar sensor subsystem.

The radar sensor or the radar device/system can process data by analyzing a transmitting signal and a reception signal, and as a result, extract information on an object. To do this, the radar sensor or the radar sensor apparatus/system can comprise an electronic or controlling circuitry ECU, or a processor. Data transmission or signal communication from the radar sensor to the electronic or control circuitry ECU or the processor can use a communication link, such as a vehicle network bus, or the like.

As described above, according to embodiments of the present disclosure, by determining vertical misalignment using an estimation error calculated for each of a plurality of ground distances, it is possible to precisely determine the vertical mounting misalignment even if there is a road surface non-uniformity, a road slope, or a change in a radar beam width.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms 'include', 'comprise', 'constitute', 'have', and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for detecting a vertical mounting misalignment of a vehicle radar device comprising:
   a monitoring range setter for determining a monitoring range in front of a vehicle based on a radar signal;
   a ground component determiner for detecting a ground component in a reflection signal from a stationary object in the monitoring range;
   an estimated vertical angle determiner for determining a ground distance to the detected ground component and an estimated vertical angle;
   an estimation error determiner for determining an estimation error that is a difference between the estimated vertical angle and a reference vertical angle set in correspondence with the corresponding ground distance; and
   a vertical misalignment determiner for determining whether of the vertical mounting misalignment of the vehicle radar device based on the determined estimation error.

2. The device for detecting a vertical mounting misalignment of a vehicle radar device of claim 1, wherein a plurality of reference vertical angles corresponding to each of a plurality of ground distances in the monitoring range are preset, and the estimation error determiner extracts a first reference vertical angle corresponding to the measured ground distance from among the plurality of reference vertical angle values, and determines the estimation error by comparing the first reference vertical angle with the estimated vertical angle.

3. The device for detecting a vertical mounting misalignment of a vehicle radar device of claim 2, wherein the vertical misalignment determiner determines the vertical mounting misalignment using the estimation error which is a difference between the estimated vertical angle and the first reference vertical angle by one measurement.

4. The device for detecting a vertical mounting misalignment of a vehicle radar device of claim 2, wherein the vertical misalignment determiner determines the vertical mounting misalignment by using statistical characteristics of the plurality of estimation errors determined by two or more measurements, or by functionalizing a cumulative distribution of the plurality of estimation errors.

5. The device for detecting a vertical mounting misalignment of a vehicle radar device of claim 4, wherein the vertical misalignment determiner excludes an estimation error out of an allowable range from among the determined estimation errors.

6. The device for detecting a vertical mounting misalignment of a vehicle radar device of claim 1, wherein the estimated vertical angle determiner determines the ground distance and the estimated vertical angle by using the radar signal transmitted and received through an antenna unit including two or more transmission antennas or receiving antennas having an offset in a vertical direction.

7. The device for detecting a vertical mounting misalignment of a vehicle radar device of claim 6, wherein the antenna unit includes two or more transmission antennas offset in the vertical direction and one or more receiving antennas arranged at the same position in the vertical direction, or the antenna unit includes one or more transmission antennas arranged at the same position in the vertical direction and two or more receiving antennas offset in the vertical direction.

8. The device for detecting a vertical mounting misalignment of a vehicle radar device of claim 7, wherein each transmission antenna included in two or more transmission antennas transmits a transmission signal modulated by a different modulation method.

9. The device for detecting a vertical mounting misalignment of a vehicle radar device of claim 1, wherein the monitoring range setter comprises,
   a range-velocity information acquisitor for extracting a range-velocity information by two-dimensional Fourier transform for a reception signal,
   a stationary object detector for determining a stationary object corresponding to a negative value of a vehicle speed of the vehicle from the range-velocity information, and
   a monitoring range determiner for determining an area of a distance including the stationary object as the monitoring range.

10. The device for detecting a vertical mounting misalignment of a vehicle radar device of claim 9, wherein the monitoring range determiner determines the monitoring range based on a vertical mounting range and a vertical beam width of the vehicle radar device.

11. The device for detecting a vertical mounting misalignment of a vehicle radar device of claim 9, wherein the range-velocity information acquisitor performs a first fourier transform (1st FFT) on the reception signal for a fast time to obtain a time component according to a distance, and performs a second fourier transform (2nd FFT) for a slow time and compresses a signal existing at each distance according to a velocity to determine the range-velocity information.

12. The device for detecting a vertical mounting misalignment of a vehicle radar device of claim 11, wherein the ground component determiner determines the ground component using at least one of a power level and a horizontal angle of the reflection signal from the stationary object.

13. The device for detecting a vertical mounting misalignment of a vehicle radar device of claim 12, wherein the ground component determiner determines the corresponding reflection signal as the ground component if the power level of the reflection signal is less than or equal to a first threshold value and the horizontal angle of the reflection signal is greater than or equal to a second threshold value.

14. The device for detecting a vertical mounting misalignment of a vehicle radar device of claim 12, wherein the ground component determiner determines the corresponding reflection signal as the ground component if the horizontal angle of the reflection signal is greater than or equal to a second threshold value.

15. A method for detecting a vertical mounting misalignment of a vehicle radar device comprising:
   determining a monitoring range in front of a vehicle based on a radar signal;
   detecting a ground component in a reflection signal from a stationary object in the monitoring range;
   determining a ground distance to the detected ground component and an estimated vertical angle;
   determining an estimation error that is a difference between the estimated vertical angle and a reference vertical angle set in correspondence with the corresponding ground distance; and
   determining whether of the vertical mounting misalignment of the vehicle radar device based on the determined estimation error.

16. A vehicle radar device comprising:
   an antenna unit including a transmission antenna for transmitting a transmission signal around a vehicle and a receiving antenna for receiving a reception signal reflected from an object;
   a controller that controls to transmit the transmission signal having a specific transmission beam pattern through the transmission antenna, and processes the reception signal received from the receiving antenna to acquire object information; and
   a vertical mounting misalignment detecting device including a monitoring range setter for determining a monitoring range in front of the vehicle based on a radar signal, a ground component determiner for detecting a ground component in a reflection signal from a stationary object in the monitoring range, an estimated vertical angle determiner for determining a ground distance to the detected ground component and an estimated vertical angle, an estimation error determiner for determining an estimation error that is a difference between the estimated vertical angle and a reference vertical angle set in correspondence with the corresponding ground distance, and a vertical misalignment determiner for determining whether of the vertical mounting misalignment of the vehicle radar device based on the determined estimation error.

17. The vehicle radar device of claim 16, wherein the antenna unit includes two or more transmission antennas offset in a vertical direction and one or more receiving antennas arranged at the same position in the vertical direction, or the antenna unit includes one or more transmission antennas arranged at the same position in the vertical direction and two or more receiving antennas offset in the vertical direction.

18. The vehicle radar device of claim 17, wherein each transmission antenna included in two or more transmission antennas transmits a transmission signal modulated by a different modulation method.

19. The vehicle radar device of claim 16, wherein a plurality of reference vertical angles corresponding to each of a plurality of ground distances in the monitoring range are preset, and the estimation error determiner extracts a first reference vertical angle corresponding to the measured ground distance from among the plurality of reference vertical angle values, and determines the estimation error by comparing the first reference vertical angle with the estimated vertical angle.

20. The vehicle radar device of claim 19, wherein the vertical misalignment determiner determines the vertical mounting misalignment using the estimation error which is a difference between the estimated vertical angle and the first reference vertical angle by one measurement.

\* \* \* \* \*